Dec. 17, 1935.  O. H. NOBLE ET AL  2,024,535
METAL WORKING MACHINERY
Filed April 8, 1932  5 Sheets-Sheet 1

INVENTORS
Oswald H. Noble
William J. Struewing
BY Murray and Zugelter
ATTORNEYS

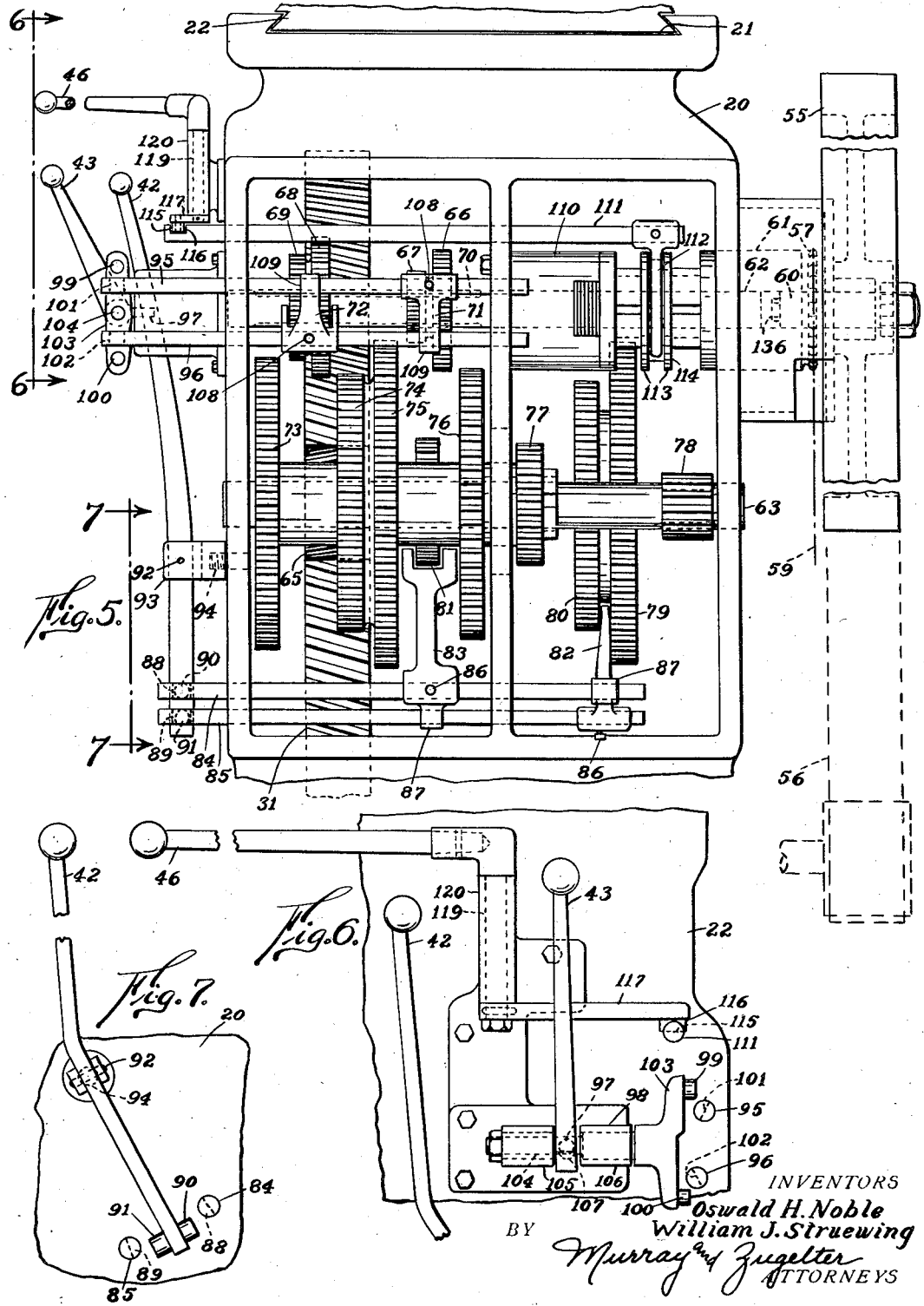

Dec. 17, 1935.   O. H. NOBLE ET AL   2,024,535
METAL WORKING MACHINERY
Filed April 8, 1932   5 Sheets-Sheet 3

INVENTORS
Oswald H. Noble
William J. Struewing
BY Murray and Zugelter
ATTORNEYS

Dec. 17, 1935.  O. H. NOBLE ET AL  2,024,535
METAL WORKING MACHINERY
Filed April 8, 1932   5 Sheets-Sheet 4

INVENTORS
Oswald H. Noble
William J. Struewing
BY Murray and Zugelter
ATTORNEYS

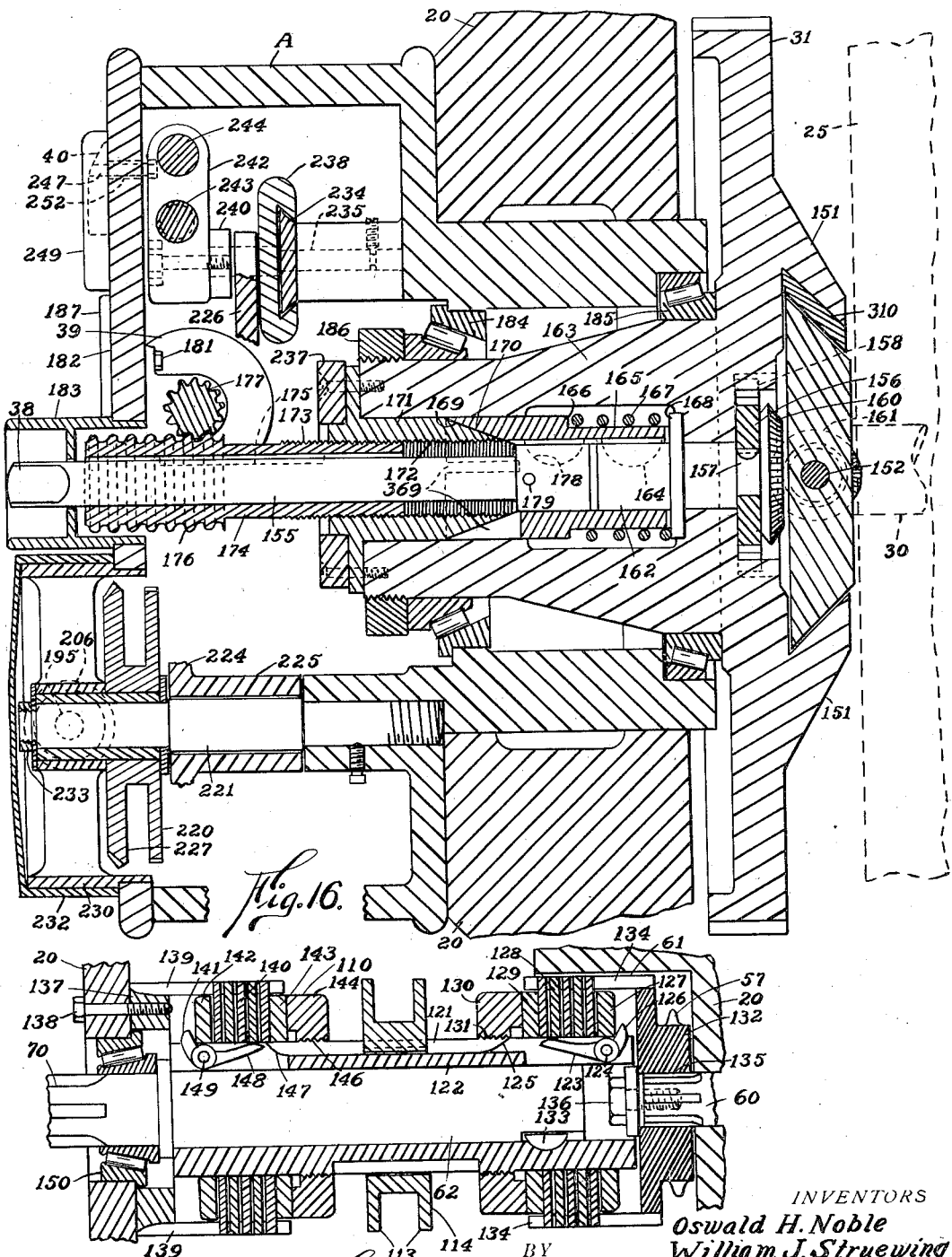

Patented Dec. 17, 1935

2,024,535

UNITED STATES PATENT OFFICE 2,024,535

METAL WORKING MACHINERY

Oswald H. Noble and William J. Struewing, Cincinnati, Ohio, assignors to The Smith and Mills Company, Cincinnati, Ohio, a corporation of Ohio Application April 8, 1932, Serial No. 603,984

14 Claims. (Cl. 90—38)

This invention relates to metal working machinery such as shapers and the like.

An object of the invention is to provide a shaper in which all the control and adjusting means are advantageously located relative to one another so as to provide for a maximum of safety and ease of manipulation.

Another object is to provide a shaper with novel means for rapid traversing of its work supporting table, irrespective of whether the ram of the machine is in operation or at rest.

Another object of the invention is to provide a shaper with novel ram stroke and tool head feed adjusting means, and direct reading enclosed indicators therefor.

A further object is to provide a novel multiple speed power transmission means of extreme simplicity and durability, and a novel change speed lever arrangement therefor.

Another object of the invention is to provide a shaper including safety means on all feeds, whereby the feeds are rendered ineffective upon reaching limits determined by the capacity of the machine.

Another object is to provide a power transmission means for machine tools, in which there is included a simple form of clutch and brake mechanism whereby motion of an associated moving part may accurately and instantly be controlled, with the expenditure of a minimum of effort.

Another object of the invention is to provide a novel chip trough structure for shapers, which moves with the work supporting table and precludes chips and the like from falling onto the cross rails.

The foregoing and other objects of more or less importance, are attained by the means described herein and disclosed in the accompanying drawings, in which:

Fig. 5 is a fragmental rear view of the shaper showing the change gear mechanism and control means.

Fig. 6 is an elevational view taken on line 6—6 of Fig. 5.

Fig. 7 is an elevational view taken on line 7—7 of Fig. 5.

Fig. 16 is a cross-sectional view through substantially the entire machine, the view being taken on line 16—16 of Fig. 3.

Fig. 17 is a fragmental cross-sectional view taken longitudinally through the clutch and brake mechanism disclosed in Fig. 5.

Figure 1:
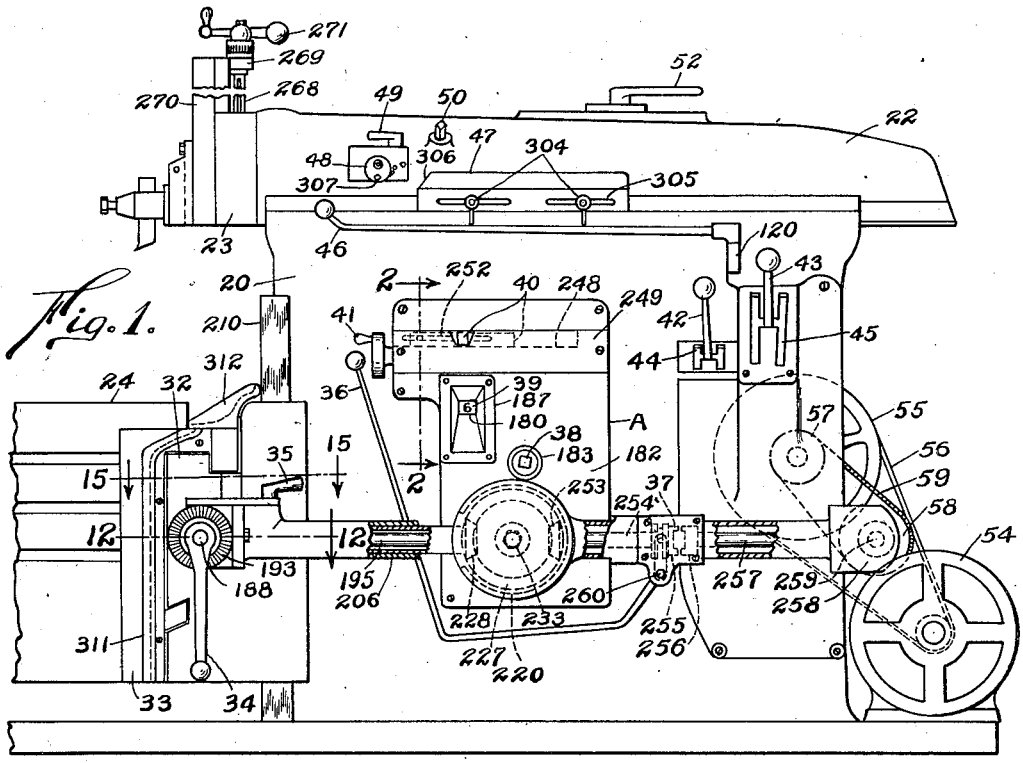
Fig. 1 is a side view of the improved shaper, parts being broken away.

The improved shaper of this invention comprises in general an upright frame 20, at the top of which is provided a suitable way 21 in which the ram 22 may be reciprocated longitudinally of the frame. The ram includes a tool head 23 which is provided with an automatic and a manual vertical feed toward and from the work supporting table 24. The ram is reciprocated by means of a rocker arm 25 (see Fig. 13) having one end pivoted upon the frame, as at 26, the other end having a link connection 27 to a member fixed relative to the ram. The rocker arm includes a harp slide indicated at 28, which slidably receives a crank pin block 29 in which is journalled the crank pin 30. The crank pin block is so associated with a bull wheel or drive wheel 31 as to provide for variation in the eccentricity of the crank pin so that the length of stroke of the ram may be varied at the will of the operator.

The work supporting table 24 is adapted to be power actuated in opposite directions transversely of the machine, and said table is suitably supported upon the carriage 33 which rides upon the rail 32. A suitable crank 34 is provided for manually traversing the work supporting table, and the automatic feed therefor is controlled by means of a reversing clutch which is controlled by the operating lever 35 (see Figs. 1, 12 and 15). The control handle 36 actuates a clutch 37 which provides for rapid traverse of the work supporting table, which may be effected whether the ram is in operation or at rest. Rotation of a square ended shaft 38, by means of a handle not shown, effects the adjustment of the stroke of the ram, and the stroke length is readable directly upon an enclosed stroke length indicator 39. The feed of the table 24 transversely of the machine is indicated in thousandths of an inch by means of an indicator 40, and the amount of feed may be regulated by means of the handle 41.

Reference characters 42 and 43 indicate change speed levers which may enter a number of cam slots 44 and 45, for such shifting of the gears as will afford twelve different speeds of ram reciprocation. The clutch and brake lever is indicated at 46, and by suitable means indicated in Figs. 5 and 17, the machine may be started, and stopped with a braking action, according as the lever is moved outwardly from the machine or toward it.

By means of a longitudinally adjustable cam plate 47, which is carried by the frame 20 and located adjacent to the ram, a ratchet mechanism 48 is actuated for automatically advancing or retracting the tool head 23 relative to the work supporting table. The lever 49 is adapted to be manipulated for selective feeding of the tool head toward or from the table. The lever 49 actuates a suitable reversing means which is shown in detail in Figs. 8 and 9.

Reference character 50 (see Fig. 8) indicates a square ended shaft adapted to receive a suitable handle, said shaft having a driving connection with a nut 51 associated with the connecting link 27, whereby upon loosening the handle 52, the position of the ram may be altered with respect to the frame 20.

Power from a motor 54 is transmitted to a driving pulley 55 by means of a belt or the like 56, and a sprocket 57 on the main drive pulley shaft drives a second sprocket 58, by means of a chain 59, the sprocket 58 being arranged to drive the rapid traversing means for the work supporting table.

The foregoing constitutes a general description of the improved machine, which now will be described in detail.

The pulley 55 is fixedly mounted upon a shaft 60, which by means of a friction clutch 61 drives the clutch shaft 62 of the power transmission device. The power transmission device comprises the three shafts which are numbered 62, 63, and 64, the relationship of which shafts is shown on Fig. 13. Fixedly secured to shaft 64 is the bull wheel pinion 65 which drives the bull wheel 31. As indicated in Fig. 5, the bull wheel and the bull wheel pinion are shown with helical type gear teeth. On the shaft 62 are mounted the sliding gears 66, 67, 68, and 69. Each of these gears is connected to a spline on the shaft, which is indicated at 70. Gears 66 and 67 preferably are of integral construction as are gears 68 and 69, and each of these pairs of gears is adapted to be shifted longitudinally of shaft 62 by means of the gear shifters 71 and 72.

On shaft 63 are fixedly mounted the gears 73, 74, 75, 76, 77, and 78. Gears 68 and 69 are adapted to be shifted for engagement with gears 74 and 73, respectively; and gears 66 and 67 are adapted to be slidably moved for engagement with gears 76 and 75. On the shaft 64 are slidably mounted the gears 79, 80, and 81, which are adapted to be shifted longitudinally of the shaft by means of the shifters 82 and 83. The bull wheel pinion 65 is non-shiftable on said shaft 64. Gears 79 and 80 preferably are integral and adapted to be shifted for engagement with gears 78 and 77, respectively. Slidable gear 81 is adapted to engage gear 76.

By shifting the gears in the manner above described, twelve different speeds are attained by means of the thirteen gears constituting the speed change device.

The gear shifting lever mechanism is fully disclosed in Figs. 5, 6 and 7. The means for shifting the gears 79, 80 and 81 comprises a pair of parallel rods 84 and 85 to which the shifters 83 and 82 are respectively fixed by means of set screws 86. Each of said shifters includes an extension 87 in which is provided a bearing bore for slidably receiving the rods 84 and 85. The shifters thereby are associated with each of the shifting rods so that each rod has a shifter secured thereto and each rod also provides a guide for precluding rotation of the rods and shifters. At the outermost ends of the shift rods are provided the recesses indicated at 88 and 89, which recesses are adapted to be selectively engaged by lugs or blocks 90 and 91 which are fixed upon the lower end of the shift lever 42. The shift lever 42 is pivoted upon a yoke which is supported by the frame of the machine, said pivot being indicated at 92, and by means thereof the shift lever 42 may be moved toward and from the frame of the machine for longitudinally reciprocating one or the other of the shifting rods 84 and 85. The yoke, which is indicated at 93, is made rotatable upon a stud 94 so that the lugs 90 and 91 (see Fig. 7) may be selectively engaged with the recesses 88 and 89 of the shifting rods. From the foregoing it should readily be apparent that by rocking the shift lever 42 of Fig. 7 to engage lug 90 with recess 88, and then moving the lever about its pivot 92, the shift rod 84 may be reciprocated. The limits to which said shift lever 42 may be moved is determined by the cam slot arrangement 44, 45 which is clearly shown in Fig. 1.

The shift rods 95 and 96 are adapted to be reciprocated by an arrangement somewhat similar to that described above, in association with the shift lever 43. As is clearly indicated in Fig. 6, shift lever 43 has a pivotal mounting upon a stud 97 whereby the assembly 98 may be rotated bodily for selectively placing the lugs 99 and 100 in engagement with recesses 101 and 102 formed in the shift rods 95 and 96 respectively. The lugs are carried by a yoke 103 to which they are fixedly secured. The yoke is provided with an extending shaft 104 which is received in bearings 105 and 106 so that the yoke may be rotated for longitudinally reciprocating the shift rods when the shift lever 43 is moved toward and from the frame 20 of the machine. The lever 43 is keyed or otherwise fixed to the shaft 104 as indicated at 107. The limits of movement of the shift lever 43 are determined by the cam slots 45 which are shown in Fig. 1. It is to be understood that the gear shifter 72 extends between the gears 68 and 69, so as to shift them when the rod 96 is reciprocated. Likewise, gear shifter 71 extends between the gears 66 and 67 so as to shift them when the rod 95 is reciprocated. Shifters 71 and 72 may be fixed to the shift rods 95 and 96, respectively, by any suitable means such as set screws 108 Each of the shifters has a slide mounting 109 on the shift rod adjacent to the one to which it is fixed. The shifting rods 84, 85, 95, and 96 are suitably supported by the frame of the machine so that they may be reciprocated laterally thereof.

The clutch and brake lever 46 has connection with the clutch 61 and brake 110 by means of a shift rod 111, the inner end of which carries a yoke member 112 which extends between the flanges 113 of a thrust collar 114. The shift rod 111 is suitably journalled in the frame of the machine, and its outer end is provided with a recess 115 which is engaged by an extension or lug 116 formed on an arm 117 which is fixed for rotational movement with the shaft 119 of the shift lever 46. Said shaft is journalled in a suitable bearing 120 fixedly supported upon the frame of the machine. By referring to Fig. 5, it will readily be understood that movement of the free end of the shift lever 46 in a direction toward or from the machine serves to reciprocate the shaft 111 and the collar 114.

By referring now to Fig. 17, it will be observed that the collar 114 has fixed thereto a taper-ended key 121 which is slidably received in the sleeve like body 122 of the combination clutch and brake means. By shifting the collar to the right, the key serves to strike a bell crank lever 123 whereby to move it about its pivot 124 as it rides on the tapered end or incline 125 of the slidable key. This action causes the end 126 of the bell crank lever to move a thrust collar 127 in a direction toward the plurality of clutch discs 128, which are to be clamped between the collars 127 and 129. It will be noted that collar 129 is backed up by a nut 130 which threadedly engages the sleeve-like body 122 as indicated at 131. By thus clamping the clutch discs between the parts 130 and 127, power is transmitted from the clutch housing 132 to the member 130, sleeve-like body 122, and shaft 62, through the key 133. It is to be understood that 134 indicates ways or slots extending longitudinally of the clutch housing 132, which slots slidably receive the outermost ends of each clutch disc 128. It is to be noted further that the clutch housing 132 is splined to the pulley driven shaft 60, as indicated at 135, and is maintained in position thereon by means of the bolt 136.

By means of the foregoing described construction, power is transmitted from the motor driven pulley 55 and its shaft 60 to the shaft 62 and each of the gears 66, 67, 68, and 69 which are splined onto said shaft 62.

The brake mechanism 110 comprises the housing 137 which is bolted or otherwise secured to the frame of the machine as indicated at 138, said housing being a cup-shaped cylinder having longitudinal slots 139 in its cylindrical wall. The outermost ends of the clutch discs 140 are received in the slots, and the members 141, 142, 143, and 144 correspond to the members 126, 127, 129 and 130 of the clutch mechanism which is shown at the right of the brake mechanism. The member 144 is screw threaded onto the sleeve 122 as indicated at 146. When the incline 147 of key 121 is slidably moved to the left so as to rock the bell crank 148 about its pivot 149, the clutch discs 140 are compressed whereby to lock them, with the parts 142—144 to the stationary housing 137. The splines 70 of Fig. 5 are shown in Fig. 17, and a bearing for the shaft 62 is indicated at 150.

By means of the combination clutch and brake mechanism above described, the mechanism is placed in operation by moving the collar 114 to the right; to stop the mechanism abruptly, the member 114 is moved to the extreme left whereby to apply the braking device. It will be understood that the change gear mechanism will normally coast to a condition of rest when the member 114 is not shifted far enough to apply the brake.

Figures 14, 15:
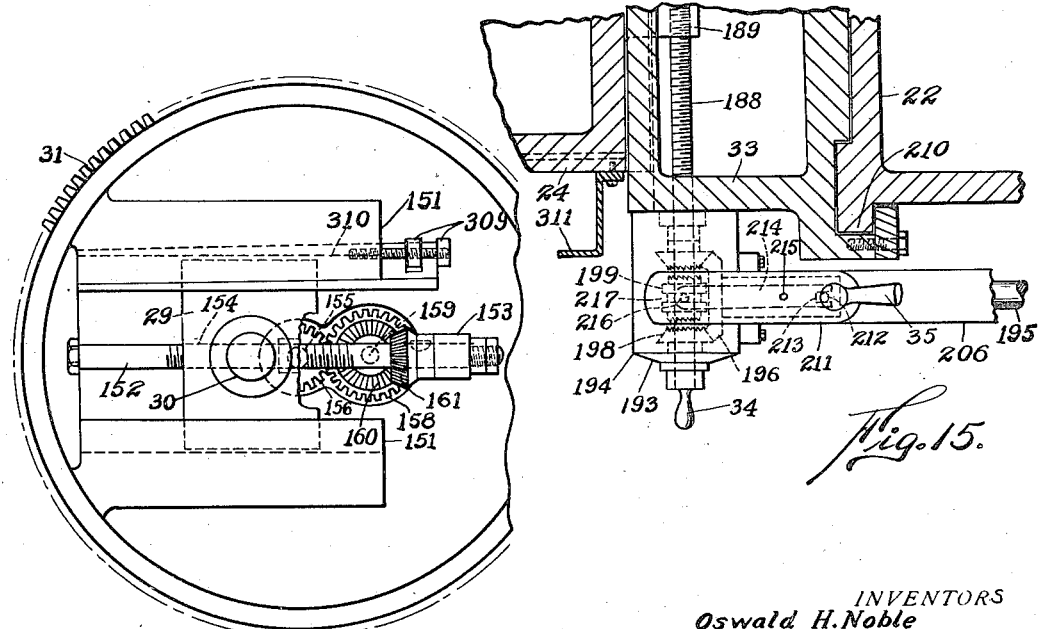
Fig. 14 is an elevational view showing in detail the bull wheel appearing in Fig. 13.
Fig. 15 is a cross-sectional view taken on line 15—15 of Fig. 1.

In Figs. 14 and 16 are shown the means for selectively changing the distance of the crank pin 30 from the center of the bull wheel, and for indicating the length of stroke of the ram. As shown in Fig. 14, the bull wheel carries a pair of guides 151 within which the crank pin block 29 may be reciprocated toward and from the center point of the bull wheel. Longitudinally of the guides, and preferably intermediate them, is a screw shaft 152 which is supported in a bearing 153 on the bull wheel. The screw shaft is threaded into a nut portion 154 of the crank pin block 29, so that rotation of the screw effects longitudinal movement of the block relative to the guides.

The screw shaft is rotated by means of the stroke adjusting shaft 155 which is provided with the squared end 38 shown in Fig. 16. By rotating the shaft 155 by means of a suitable handle not shown, rotation is imparted to a spur gear 156 which is keyed or otherwise fixed onto the shaft as at 157. Said spur gear is in mesh with a second spur gear 158 which is rotatably mounted upon a suitable stud shaft 159. A bevel gear 160 is mounted for rotation with the spur gear 158, and said bevel gear meshes with a second bevel gear 161 which is keyed onto the screw shaft 152. Thus it should be apparent that the screw shaft 152 will be rotated in one direction or the other, depending upon the direction of rotation given to the shaft 155 by means of the handle which is applied to the squared end 38.

The stroke adjusting shaft comprises two parts, 155 and 162. The part 162 carries the spur gear 156, and is journalled in the large hub 163 of the bull wheel. The part 162 is provided with a suitable key 164 whereby said part is adapted for rotation with a friction sleeve 165. The friction sleeve has a shoulder 166 which is abutted by a suitable compression spring 167 that abuts also an annular flange 168 of shaft 162. The end of the sleeve which is opposite to key 164 is provided with a tapered smooth bore 169 which is adapted to receive a correspondingly tapered conical end 170 of a bushing 171. The bushing has an internally threaded bore 172 which is adapted to receive the threaded end 173 of an indicator actuating sleeve 174. Said sleeve is keyed or splined onto the shaft 155 at 175, and the end thereof opposite the threaded end 173 is provided with a plurality of spaced circular ribs or rings 176 so as to provide a rack with which engages a pinion 177 that is fixed relative to the indicator drum 39 which carries suitable indicia for indicating the length of ram stroke in inches or other units of linear measure. It is to be observed that the friction sleeve 165 is keyed to shaft part 155 at 178, as well as to shaft part 162. The keyway at 164 is sufficiently loose to permit a very slight reciprocation of the shaft 155, so that the surfaces 169 and 170 may be disengaged from one another by moving the shaft slightly inwardly toward the bull wheel. The sleeve 165 is pinned or otherwise fixedly secured to shaft part 155 as indicated at 179.

To vary the stroke of the crank pin 30, it is necessary only to apply a handle to the squared end 38 and to apply a slight inward force to the shaft 155 sufficient to overcome the resistance of spring 167, whereupon the friction surfaces 169 and 170 are parted and the shaft 155, together with its counterpart 162, may be rotated for actuating the gear mechanism 156—161 for sliding the crank pin block 29 in its guides. During rotation of shaft 155 by means of the handle, as above described, the threaded portion 173 of the indicator sleeve advances or retracts relative to the threaded interior of bushing 171 whereby to move the rack 176 longitudinally of the shaft, which in turn rotates the pinion 177 and its associated indicator drum 39 so that the indicia carried by the drum may be observed through the window 180 (see Figs. 1, 2 and 3.) The frictional surfaces 169 and 170, when in contacting relationship, overcome any tendenay of the crank pin block to move the shaft 155 during operation of the machine. The friction surface 169 may be broken by means of a plurality of longitudinal slots 369, to provide for yielding expansion of the sleeve 165 within the bore of hub 163 when the surface 169 and 170 are in engagement, thereby affording a yielding frictional abutment of member 165 upon the hub interior.

The indicator mechanism 39—177 is bolted or otherwise fixedly secured, as at 181 to the cover plate 182 of housing A. The cover plate carries also a fixed guard or guide member 183 which supports the squared end 38 of shaft 155. The enlarged hub 163 of the bull wheel preferably is supported for rotation in the anti-friction bearings 184 and 185. Threaded collar 186 serves to maintain the bearing 184 in position upon the hub.

From the foregoing it will be observed that the bull wheel 31, its hub 163 and the parts contained within the hub and also shaft 155 and indicator sleeve 174, rotate as a unit when the bull wheel is driven by the bull wheel pinion as hereinbefore described. The foregoing constitutes the mechanism for varying the stroke of the ram and for indicating the length of stroke on the direct-reading drum or dial 39 which is observable through the window 180 in the dial plate 187.

Means are provided for traversing the work supporting table 24 laterally of the machine on the rail 32, and for indicating the amount of feed in thousandths of an inch upon a suitable indicator 40. As is clearly shown in Fig. 15, the vertically adjustable carriage 33 has journalled therein the feed screw 188 which enters and engages the nut 189 which is fixed relative to the work supporting table 24. By rotating the screw 188, the table 24 is moved transversely of the machine. Said movement of the table may be effected by means of the handle 34 (see Fig. 12) which has clutch teeth 190 adapted to engage complementary clutch teeth 191 which are formed on a rotatable bushing 192 that is pinned or otherwise fixed for rotation with the screw shaft 188. By pressing inwardly and simultaneously rotating the handle 34, shaft 188 may be rotated manually. An index dial 193 indicates the amount of rotation of the shaft.

The feed screw shaft passes through a housing 194 into which projects a power shaft 195 which effects power actuation of the driving means. The power shaft 195 is adapted to drive a bevel gear 196 which is in constant meshing relationship with a pair of bevel gears 197 and 198 which are mounted upon the shaft 188 for free rotation. Between the gears 197 and 198, and splined upon the shaft, is a longitudinally shiftable clutch member 199 which is provided at its ends with the clutch teeth 200 and 201. By shifting the clutch member, the teeth 200 and 201 may be caused to selectively engage clutch teeth 202 of gears 197 and 198. Rotation in opposite directions thereby may be imparted to the shaft 188.

It is to be noted that the drive connection between shaft 195 and gear 196 is not direct, but is effected by means of a friction clutch interposed between said parts. The friction clutch comprises a plurality of clutch discs 203 which are mounted for rotation relative to the shaft 195, the outermost ends thereof being received in longitudinal splines 204 formed in the bearing sleeve 205 which is integral with the gear 196. The bearing sleeve may rotate freely within the tubular casing 206. The clutch discs 207 which are intermediate those indicated at 203 have a spline connection, as at 208, with the shaft 195, these discs having no connection with the bearing sleeve 205; the compression spring 209, however, maintains all of the clutch discs in contacting relationship so that a frictional driving connection is maintained between the shaft 195 and the bearing sleeve 205 which carries the bevel gear 196. By means of the foregoing construction, the driving connection to the transversely moving work supporting table is terminated in the event that the table offers any abnormal resistance to rotation of the feed screw 188. It is to be observed also that the construction above described permits relative longitudinal movement of the parts 195 and 206, such as occurs when the carriage 33 is adjusted vertically along the rail 210 (see Fig. 1).

Longitudinal shifting of the clutch member 199 is effected by means of the handle 35 which is shown in Fig. 15. The handle preferably is journaled in a cover plate 211 and has an extending eccentric lug 212 thereon which engages a slot 213 formed in a longitudinal lever 214 which is pivoted at 215. The opposite end of the pivoted lever carries an extending lug 216 which rides in the groove 217 of the shiftable clutch member. By moving the lever 35 to the right or left, the clutch may be engaged for rotating the feed screw in opposite directions, and when the lever is disposed in an intermediate position the clutch teeth are in a neutral position so as to impart no rotational movement to the feed screw. The character 218 (see Fig. 12) indicates a nut on the end of shaft 195, which provides an abutment for the spring 209 that holds the clutch discs constantly in an abutting condition; the shoulder 219 of the power shaft provides a cooperative abutment for the clutch discs.

Regulatable means are provided for imparting successive partial rotations to the shaft 195 for the purpose of automatically traversing the work supporting table a slight distance upon each rearward movement of the ram. Said means comprises a ratchet wheel 220 which is mounted for free rotation upon a suitable stub shaft 221 extending from the frame of the machine. The ratchet wheel is adapted to be engaged by a pawl 222 which has a pivotal mounting at 223 upon a rocking plate or lever 224. The rocking lever or plate has a bored hub 225 whereby said plate or lever is mounted upon the stub shaft for free rocking movement. By referring to Figs. 3 and 4, it becomes readily apparent that vertical reciprocations of the connecting rod 226, which is pivoted at 327, effects a rocking movement of the member 224 and thereby carries the pawl along the teeth of the ratchet wheel. Each upward movement of the connecting rod 226 effects a partial rotation of the ratchet wheel and the large bevel gear 227 which moves with the ratchet wheel and preferably is integral therewith. The bevel gear 227 is maintained in constant mesh with a bevel pinion 228 which is keyed or otherwise fixedly secured to the shaft 195 that leads to the table traversing screw control mechanism. The tubular housing 206 which supports the bevel pinion has a fixed mounting at 229 upon a freely rotatable spider 230, thereby providing for limited radial movement in the directions of the arrows 231 (see Fig. 3), which radial movement results from vertical adjustment of the table 24 along the vertical rails 210 (see Fig. 1). The cover plate 232 surrounds the spider and provides a protective plate for the spider, the ratchet mechanism, and the outer end of stub shaft 221. The nut 233 maintains the spider and the elements 220, 227, and 225 in proper position upon the stub shaft.

Figures 2, 3, 4:
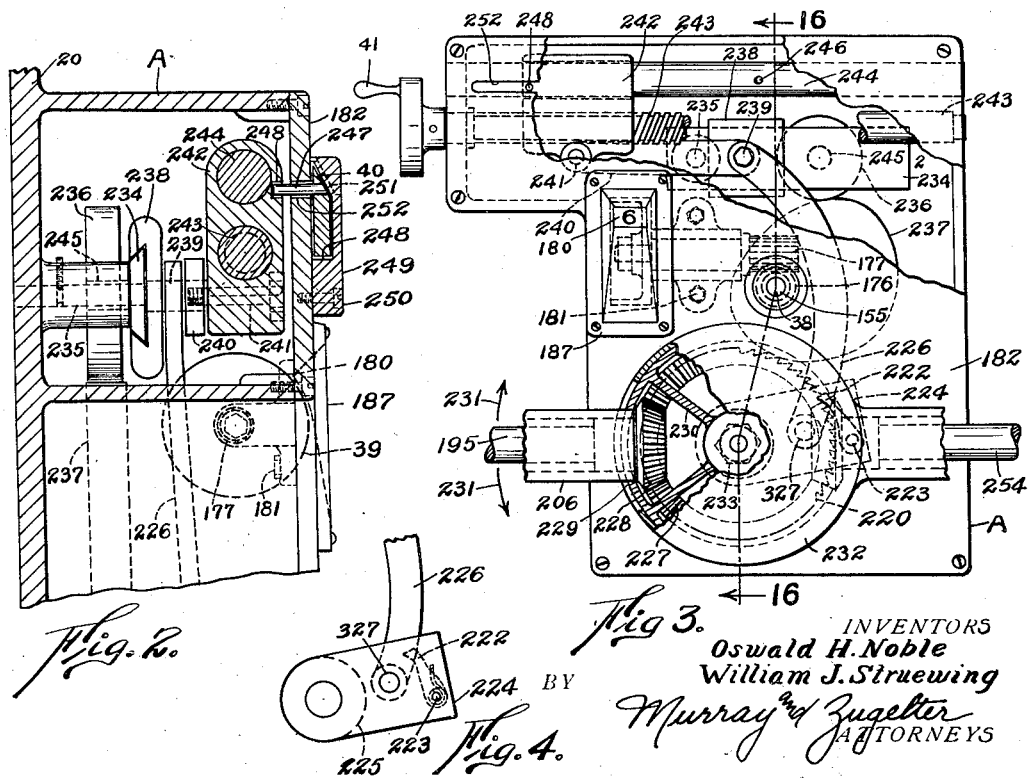
Fig. 2 is a cross sectional view taken on line 2—2 of Fig. 1.
Fig. 3 is an enlarged elevational view showing the housing "A" of Fig. 1 with part of its cover broken away to disclose the mechanism enclosed thereby.
Fig. 4 is a detail view showing in elevation a ratchet pawl mounting shown also in Fig. 3.

In order to provide for varying the peripheral movement of the pawl 222 relative to the ratchet wheel, there is provided the means indicated at the upper part of Fig. 3. Said means comprises a rockable lever or guide bar 234 which is pivoted at 235 upon a suitable stationary part of the housing A. This guide bar carries a cam roller or follower 236 which is adapted to ride upon a constantly rotating cam 237 which rotates with the shaft 155 and the hub of the bull wheel. As the cam rotates the guide bar 234 will move about its pivot 235.

Slidably mounted upon the guide bar is a slide or block 238 to which is pivoted the upper end of the connecting bar 226 that actuates the pawl, the pivotal point being indicated at 239. At the same pivotal point 239 there is pivoted the connecting link 240 which has its opposite end 241 pivoted upon a longitudinally adjustable block or nut member 242 the position of which may be altered by means of the screw 243 which is fixed relative to the operating handle 41. The block is arranged for free reception of a guide bar 244 which precludes rotation of the member 242 relative to the adjusting screw.

From the foregoing it should readily be apparent that by moving the member 242, by means of handle 41, longitudinally of the screw, the link 240 will be moved so as to vary the distance of the slide 238 from the pivotal point 235 of the member 234 upon which said slide is mounted. Obviously, then, the greater the distance between the pivot 235 and the pivotal mounting 239 carried by block 238, the greater will be the stroke of the connecting rod 226 which actuates the pawl 222. The cam roller 236 is mounted upon the lever 234 by means of a stub shaft 245 which may be integral with the said lever. The character 246 indicates a stop for the adjustable member 242. In order to indicate the amount of feed to be imparted to the table traversing screw, there is provided the indicator member 40 which is slid longitudinally of the cover plate 182 by means of a pin 247 that engages an aperture 248 formed in the longitudinally adjustable member 242. The pin 247 may be carried along by the member 242, and it is preferably fixed relative to the indicator bar 40. The bar 40 is supported in a way 248 provided in the bar guide 249, which bar guide may be fixed to the cover plate by means of screws 250. The bar guide is provided with a suitable small window 251 through which is exposed suitable markings, preferably figures indicating thousandths of an inch, which markings are carried by the face of the indicator bar 40. The markings extend transversely of the indicator bar and are applied thereto in succession from one end of the bar to the other so that upon longitudinal movement of the member 242 by means of handle 41, different markings are observable through the window 251. The pin 247 moves through a longitudinal horizontal slot 252 provided in the cover plate 182.

Rapid traversing of the work supporting table is by means of a bevel pinion 253, (see Fig. 1), which is in constant mesh with the large bevel gear 227. The pinion is fixed on one end of a stub shaft 254, the opposite end of which shaft carries a suitable clutch element such as a dog clutch member 255 which is provided with a spline, (not shown), whereby the member 255 may be shifted longitudinally along the stub shaft to engage the cooperative clutch element 256. Because of the constant meshing of gears 253 and 227, the stub shaft 254 is rotated or partially rotated at each movement of the ratchet mechanism.

Figure 13:
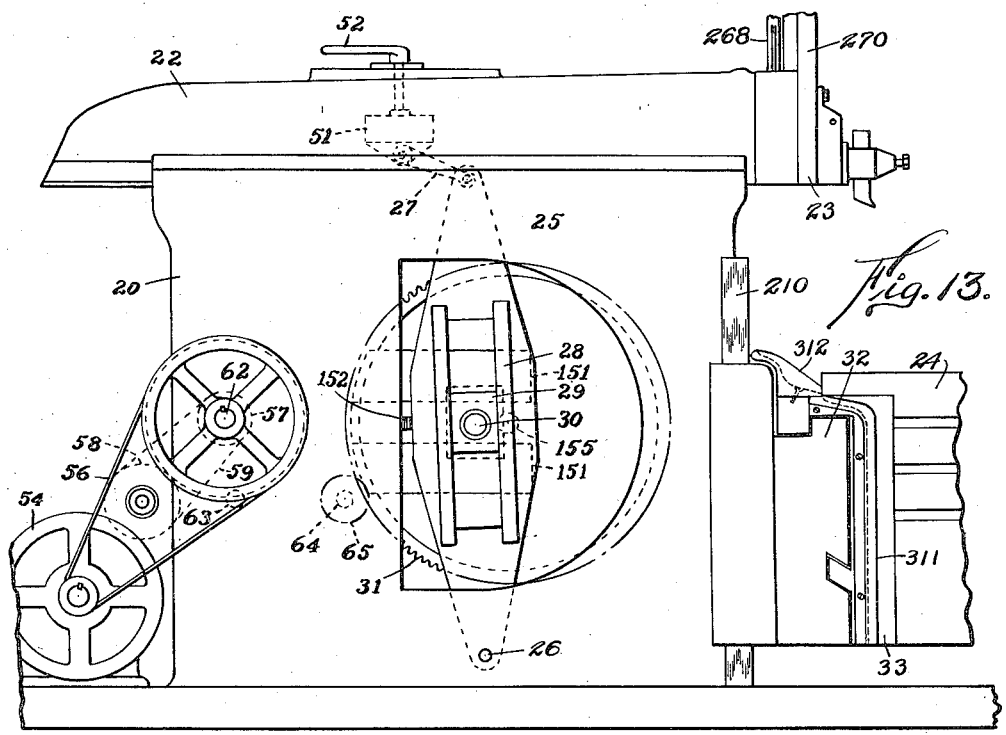
Fig. 13 is an elevational view showing the side of the machine opposite to that of Fig. 1.

The driving element 256 of the clutch 37 is fixed on one end of the rapid traverse drive shaft 257, and said shaft is constantly rotated at a comparatively high speed by reason of its having a geared connection, at the elbow 258, with a transverse shaft 259 to which is secured the constantly driven sprocket 58. As stated before, and as shown in Figs. 1, 5 and 13, the sprocket 58 is driven constantly by means of a chain 59 which passes over the sprocket 57 that rotates with the motor driven pulley 55. Obviously, then, when the clutch elements 255—256 are placed in engagement by means of the lever 36, (which lever is pivoted at 260), the shaft 257 will drive the short shaft 254, large bevel gear 227, shaft 195 and the table traversing screw provided that the clutch controlled by handle 35 is in an engaged condition. This rapid traversing of the table will be effected irrespective of the continued operation of the ratchet mechanism, because the rapid traversing means drives the ratchet wheel in the same direction of rotation as does the pawl 222, thereby causing the pawl to glide over the ratchet wheel teeth while the rapid traversing is being effected. The clutch 37 may be of any usual or accepted type adapted to accomplish the purpose stated above.

Figure 8:
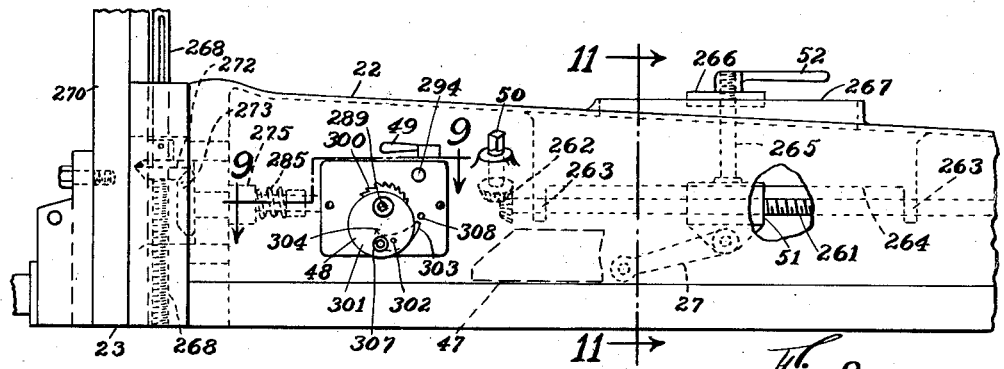
Fig. 8 is a fragmental side view of the ram of the shaper.
Figures 11, 12:
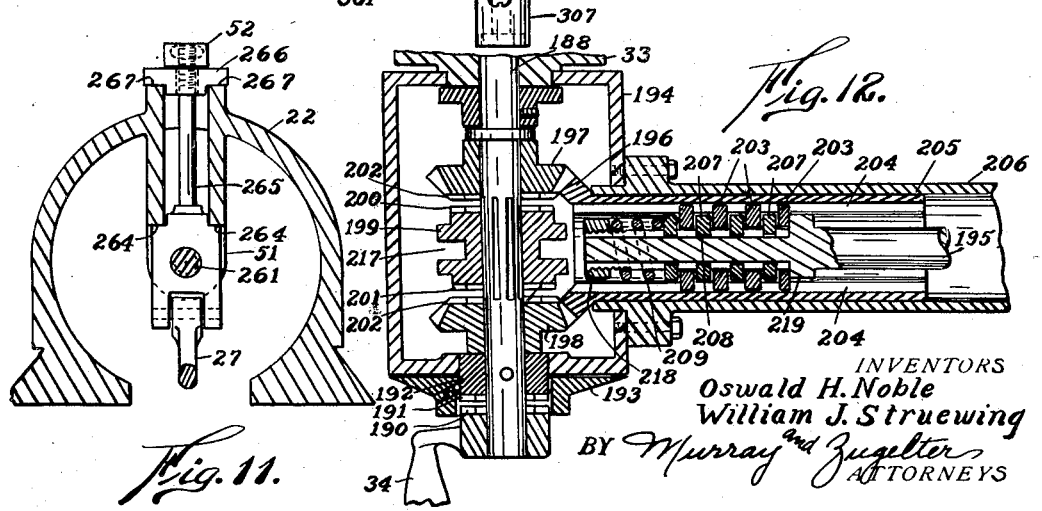
Fig. 11 is a cross-sectional view taken on line 11—11 of Fig. 8.
Fig. 12 is a cross-sectional view taken on line 12—12 of Fig. 1.

As is most clearly shown in Figs. 8, 11 and 13, the ram may be shifted longitudinally, relative to the rocker arm connection at 27, so as to make the cutting tool work farther from the machine frame, if desired or necessary. The means for shifting the ram comprises the adjustable pivot block or nut 51 that may be caused to travel along the screw 261 by applying a suitable handle, not shown, to the square ended shaft 50 which has a geared connection 262 with the screw, and then rotating said shaft. The screw may be journaled in bearings such as are indicated at 263, and intermediate the bearings are the spaced parallel rails or guides 264 upon which the block may bear or abut. After positioning the block 51 at the desired or required location, it may be locked in place by means of the locking handle 52 which threadedly engages the upper end of a vertical screw 265 which is fixedly mounted upon the block 51. The character 266 indicates a slide which may ride upon the guides 267 of the ram, and through which extends the member 265. The slide provides an abutment for the locking handle 52.

Figures 9, 10:
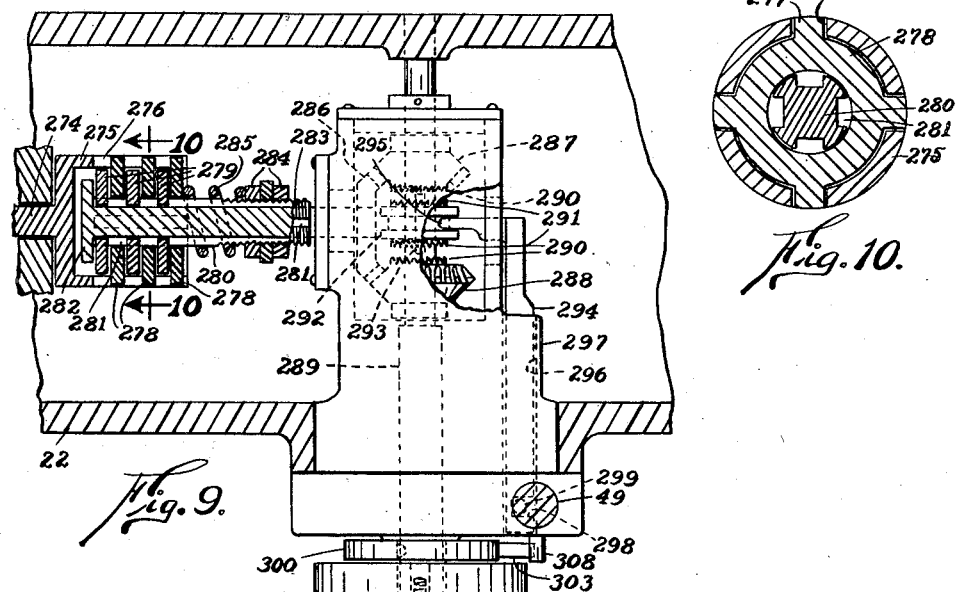
Fig. 9 is a cross-sectional view taken on line 9—9 of Fig. 8, showing in detail the tool head feed.
Fig. 10 is a cross-sectional view taken on line 10—10 of Fig. 9.

The mechanism for effecting vertical feeding of the tool head 23 is illustrated in Figs. 8, 9 and 10. Said mechanism comprises the vertical screw 268 which is journaled in a part 269 that extends from the vertical reciprocable slide member 270 of the tool head. The upper end of the screw is provided with a handle 271 (see Fig. 1) whereby the screw may be rotated manually. The screw is provided with the customary bevel gear construction 272—273, which may be of the type disclosed in the patent of E. E. Wood, No. 916,085, bearing date of March 23, 1909. The bevel gear 273 is fixedly secured to a shaft 274, the innermost end of which shaft is developed into a cup-shaped housing member 275 which is provided with a plurality of longitudinal slots 276 adapted to slidably receive the peripheral lugs 277 that are formed on the clutch discs 278. Clutch discs 279 which are intermediate the discs 278 have a similar spline connection with a shaft 280, as at 281. The end 282 of said shaft carries an enlargement which forms an abutting plate for the clutch discs, and said enlargement is surrounded by the housing 275 at a distance from the clutch discs. The shaft 280 may be threaded as at 283 for reception of a locknut means 284 whereby a spring 285 is adapted to act upon the clutch discs for holding them in contacting relationship. The foregoing described construction provides a clutch connection whereby slippage may occur in the event that abnormal resistance be applied opposing rotation of the bevel gear 273.

The shaft 289 is rotated by means of a bevel gear structure which is shown in Fig. 9, and which comprises the bevel gear 286 fixed to shaft 289 and maintained in constant mesh with a pair of bevel pinions 287 and 288. The bevel pinions are mounted upon a transverse shaft 289 so as to have free rotation thereon. Each bevel gear is provided with a clutch toothed portion 290 which may be engaged by the cooperative clutch toothed portions 291 which are carried by a longitudinally shiftable clutch member 292 that has a spline connection 293 with the shaft 289.

The clutch member 292 may be shifted longitudinally of the splined shaft 289 by means of the laterally shiftable rod or shaft bar 294 which has a projection 295 that engages the shiftable clutch element. The shaft bar 294 may ride in a suitable guideway 296 provided in the housing member 297. Near the outermost end of the member 294 may be provided a slot or aperture 298 adapted to receive an extending lug 299 carried by the handle spindle 49 and disposed eccentrically to the axes of said handle spindle.

From the foregoing it should readily be apparent that partial rotations of the handle 49 will serve to shift the member 294 longitudinally whereby to engage the shiftable clutch member 292 with the clutch teeth of either one of the gears 287 or 288. The shaft 280 thereby may be power actuated in opposite directions of rotation although the shaft 289 rotates intermittently in one direction only.

The means for intermittently rotating the shaft 289 comprises the ratchet mechanism which is indicated generally by the character 48. Said ratchet mechanism comprises a ratchet wheel 300 which is fixed onto the exposed or outer end of shaft 289. Adjacent to the ratchet wheel is mounted an eccentric or crank member 301 which has free rotational movement about the shaft and relative to the ratchet wheel. Member 301 has pivoted thereto, as at 302, a pawl 303 the end 304 of which is adapted to always remain in contacting relationship with the teeth of the ratchet wheel. From the foregoing it should readily be apparent that a swinging to and fro movement of the member 301 will effect intermittent rotational movement of the ratchet wheel 300 and the shaft 289 to which it is fixed.

The swinging movement of member 301 above referred to may be accomplished by means of a cam member or plate 47 which is carried by the frame of the machine and which, by means of the nut and bolt members 304, may be adjusted longitudinally of the bed of the machine. The cam member is provided with suitable longitudinal slots 305 which receive the securing means 304. At the forward end of the cam plate or member 47 is provided an incline 306 upon which may ride a roller or cam follower 307 that is fixed to the swinging eccentric or crank member 301. As the ram reciprocates, the roller 307 strikes inclined face 306, thereby imparting to the member 301 and the pawl carried thereby a partial rotational movement, which movement is translated, by the pawl, to the ratchet wheel 300 and its shaft 289. The character 308 indicates a stop for limiting swing movement of member 301 and pawl 303 in the counter-clockwise direction. The end of the pawl which is opposite the ratchet-wheel-engaging end 304, may be weighted or spring urged so as to maintain the end 304 always in contacting relationship with the ratchet wheel.

The character 310 indicates an adjustable gib adapted to be locked in adjusted positions by means of the locknut structure 309, (see Figs. 14 and 16). Figs. 13 and 15 disclose a novel form of chip trough structure which comprises the substantially vertical troughs 311 and the communicating transverse trough 312, these troughs being carried by the carriage so as to move with the table while it moves along the cross rail. The trough portion 312 overhangs the cross rail to prevent, to a great extent, the dropping of chips or cuttings onto the cross rail. By having the trough move with the table, the trough need not be made as extensive as those which are stationarily mounted on the machine frame, and it performs its function very effectively, requiring but little space at the head end of the machine.

From the foregoing, it should be apparent that we have produced an improved, highly effective and desirable machine which may be operated with utmost facility to perform its work accurately and in a minimum of time. It is to be understood that the device of the invention may be altered as to structural details such as are not prohibited by the scope of the appended claims, without departing from the spirit of the invention.

We claim:
1. The combination with a shaper comprising a frame, a ram mounted for reciprocation relative to the frame, a tool head on the ram, a change speed power means and mechanism associated therewith for reciprocating the ram, of a vertical feed means for the tool head comprising a vertical screw and a shaft having geared connection with the screw, a pawl and ratchet wheel carried by the ram and having geared connection with said screw driving shaft, a cam plate adjustably secured to the frame and extending longitudinally of the ram in the path of movement of the pawl for moving the pawl upon reciprocation of the ram and effecting the vertical feed of the tool head through the geared connections between the ratchet wheel, the shaft, and the vertical screw, and a manually operable reversing means and a safety clutch associated with the screw driving shaft so as to slip when subjected to abnormal resistance.

2. A shaper comprising in combination a frame, a ram mounted for reciprocation relative to the frame, a tool head on the ram, a change speed power means and mechanism associated therewith for reciprocating the ram, a work supporting table including a table traversing screw and a cooperative nut, a rapid traverse drive shaft disposed exteriorly of the frame and extending in the direction of the ram movement, said drive shaft rotating constantly at a substantially uniform rate of speed, a driven shaft aligned with the drive shaft exteriorly of the frame, and a normally disengaged outside clutch connecting said shafts, a third shaft having geared connection with the table traversing screw, and a swivel joint connection including gearing between said third shaft and said driven shaft whereby said shafts may rotate in unison, though the elevation of the work supporting table be altered, and means associated with said gearing to impart successive partial rotations to said third shaft upon disengagement of the aforesaid clutch.

3. A shaper comprising in combination a frame, a ram mounted for reciprocation relative to the frame, a tool head on the ram, a change speed power means and mechanism associated therewith for reciprocating the ram, a work supporting table including a table traversing screw and a cooperative nut, a rapid traverse drive shaft disposed exteriorly of the frame and extending in the direction of the ram movement, said drive shaft rotating constantly at a substantial uniform rate of speed, a driven shaft and a normally disengaged clutch connecting said shafts, a third shaft having geared connection with the table traversing screw, a swivel joint connection between said third shaft and said driven shaft whereby said shafts may rotate in unison though the elevation of the work supporting table be altered, means for rotatably supporting all of said shafts in substantially axial alignment, and a reversing mechanism associated with the shafts for reversing the direction of rotation of the table traversing screw.

4. A shaper comprising in combination a frame, a ram mounted for reciprocation relative to the frame, a tool head on the ram, a change speed power means and mechanism associated therewith for reciprocating the ram, a work supporting table including a table traversing screw and a cooperative nut, a rapid traverse drive shaft rotating constantly at a substantially uniform rate of speed, a driven shaft and a normally disengaged manual clutch connecting said shafts, a third shaft having geared connection with the table traversing screw, a bevel gear mounted for rotation transversely of said shafts, a bevel pinion fixed on the driven shaft and a bevel pinion fixed on said third shaft, said pinions being in constant meshing relationship with the bevel gear, a ratchet toothed wheel mounted for rotation with the bevel gear, a pawl, means for moving the pawl to and fro over the teeth of the ratchet wheel whereby to drive the ratchet wheel in one direction of rotation, and means for varying the stroke of the pawl.

5. In combination a power transmission means, a rotatable ratchet wheel having ratchet type teeth thereon, a pawl for normally engaging the ratchet wheel teeth and moving it in one direction of rotation, power driven means including an adjustment whereby the pawl selectively may be caused to rotate the ratchet wheel through predetermined peripheral distances, said power driven means and adjustment therefore comprising a pivoted guide bar, a slide on the bar, and means for moving the slide to adjusted positions at various distances from the guide bar pivot, and a link pivoted to the slide and arranged to move the pawl relative to the ratchet wheel, and means for transmitting rotational movement of the ratchet wheel to the power transmission means.

6. In combination a pair of ratchet drive elements, a guide bar mounted for pivotal movement at one of its ends, a slide on the guide bar adapted to be moved to and maintained at predetermined locations along the guide bar, normally stationary means for moving and maintaining said slide at the predetermined locations, a connecting means between the slide and one of the ratchet drive elements, a power driven eccentric cam, a cam follower on the guide bar, and a movable indicating device associated with the aforesaid normally stationary slide moving means.

7. In combination a power transmission means, a rotatable ratchet wheel having ratchet type teeth thereon, a pawl for normally engaging the ratchet wheel teeth and moving it in one direction of rotation, power driven means including an adjustment whereby the pawl selectively may be caused to rotate the ratchet wheel through predetermined peripheral distances, said power driven means and adjustment therefor comprising a pivoted guide bar, a slide on the bar, and means for moving the slide to adjusted positions at various distances from the guide bar pivot, and a link pivoted to the slide and arranged to move the pawl relative to the ratchet wheel, means for translating rotational movement of the ratchet wheel to the power transmission means, and selectively operable means for independently rotating the ratchet wheel in the same direction as does the pawl, but at a higher rate of speed.

8. In combination a pair of ratchet drive elements, a longitudinal guide bar mounted for pivotal movement at a point adjacent to one of its ends, a slide on the guide bar adapted to be moved to and maintained at predetermined locations along the guide bar, a normally stationary rotatable screw extending in substantial parallelism with the guide bar, a nut member having threads engaging the screw so as to be movable longitudinally thereof upon rotation of the screw, means connecting the adjustable slide to the nut member so that longitudinal movement of the nut member will be transmitted to the slide, a connecting means between the slide and one of the ratchet drive elements, a power driven eccentric cam, a cam follower on the guide bar and a movable indicating device associated with the nut member.

9. A shaper comprising in combination a frame, a ram mounted for reciprocation relative to the frame, a tool head on the ram, a change speed power means and mechanism associated therewith for reciprocating the ram, a work supporting table including a table traversing screw and a cooperative nut, a rapid traverse drive shaft rotating constantly at a substantially uniform rate of speed, a driven shaft and a normally disengaged controllable clutch connecting said shafts, a third shaft having geared connection with the table traversing screw, a gear mounted for rotation transversely of said shafts, a pinion fixed on the driven shaft and a pinion fixed on said third shaft, said pinions being in constant meshing relationship with the gear, a ratchet toothed wheel mounted for rotation with the gear, a pawl, means for moving the pawl to and fro over the teeth of the ratchet wheel whereby to drive the ratchet wheel in one direction of rotation, and means for varying the stroke of the pawl.

10. In a shaping machine, the combination of a frame, a work supporting table, a transverse rail relative to which the table is slidably mounted for movement transversely of the machine frame, a tool supported by the frame at a location above the table for operating upon material supported by said table, a channel member fixed alongside the table for movement with the table, to guide gravitating chips which leave the tool during operation of the machine, said channel member being extended but slightly beyond the body line of the table, a chip trough above the rail and having an end in communicating relationship with the channel member, and means for fixing the chip trough for bodily movement with the table and the channel member.

11. In a shaping machine, the combination of a frame, a work supporting table, a transverse rail relative to which the table is slidably mounted for movement transversely of the machine frame, a tool supported by the frame at a location above the table for operating upon material supported by said table, a channel member fixed alongside the table for movement with the table, to guide gravitating chips which leave the tool during operation of the machine, said channel member being extended but slightly beyond the body line of the table, a chip trough above the rail and having an end overhanging the table sufficiently only to rest in communicating relationship with the channel member, and means for fixing the chip trough for bodily movement with the table and the channel member.

12. In a shaping machine, the combination of a frame, a work supporting table, a transverse rail relative to which the table is slidably mounted for movement transversely of the machine frame, a tool supported by the frame at a location above the table for operating upon material supported by said table, channel members fixed, one each, relative to the table at opposite sides thereof for movement with the table, to guide gravitating chips which leave the tool during operation of the machine, both of said channel members being extended but slightly beyond the body line of the table, a chip trough above the rail and having opposite ends overhanging the table sufficiently only to rest in communicating relationship with each of the relatively narrow channel members, and means for fixing the chip trough for bodily movement with the table and the channel members.

13. A shaper comprising in combination a frame, a ram mounted for reciprocation relative to the frame, a tool head on the ram, a change speed power means and mechanism associated therewith for reciprocating the ram, a work supporting table including a table traversing screw and a cooperative nut, a rapid traverse drive shaft disposed exteriorly of the frame and extending in the general direction of the ram movement, said drive shaft rotating constantly at a substantially uniform rate of speed, a driven shaft and a normally disengaged clutch for connecting said shafts, a third shaft having geared connection with the table traversing screw, a swivel joint connection between said third shaft and said driven shaft whereby said shafts may rotate in unison though the elevation of the work supporting table be altered, means for rotatably supporting all of said shafts in substantially axial alignment, a reversing mechanism associated with the shafts for reversing the direction of rotation of the table traversing screw, and a slow feed means for the work supporting table operable selectively during operation and inoperation of the table rapid traverse to automatically resume the slow feed upon termination of the rapid traverse operation.

14. A shaper comprising in combination a frame, a ram mounted for reciprocation relative to the frame, a tool head on the ram, a change speed gear means and mechanism associated therewith for reciprocating the ram, a work supporting table including a table traversing screw and a cooperative nut, a rapid traverse drive shaft disposed exteriorly of the frame and extending in the general direction of the ram movement, means for rotating said drive shaft constantly at a substantially uniform rate of speed while all gears of the change speed gear means are at rest, a driven shaft and a normally disengaged clutch for connecting said shafts, a third shaft having operative connection with the table traversing screw and nut, a swivel joint connection between said third shaft and said driven shaft whereby said shafts may rotate in unison though the elevation of the work supporting table be altered, means for rotatably supporting all of said shafts in substantial axial alignment, a reversing mechanism for reversing the direction of table traverse, and a slow traversing feed means for the work supporting table operable during operation of the table rapid traverse to automatically resume the slow feed upon termination of the rapid traverse operation.

OSWALD H. NOBLE.
WILLIAM J. STRUEWING.